US010025034B1

(12) United States Patent
Sakurai

(10) Patent No.: US 10,025,034 B1
(45) Date of Patent: Jul. 17, 2018

(54) INTEGRATED OPTICAL DEVICE

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 0 days.

(21) Appl. No.: 15/899,407

(22) Filed: Feb. 20, 2018

(30) Foreign Application Priority Data

Mar. 17, 2017 (JP) .................................. 2017-052869

(51) Int. Cl.
| | |
|---|---|
| G02B 6/00 | (2006.01) |
| G02B 6/26 | (2006.01) |
| G02B 6/32 | (2006.01) |
| G02B 6/35 | (2006.01) |
| G02B 6/27 | (2006.01) |
| G02B 6/293 | (2006.01) |
| G02B 6/42 | (2006.01) |

(52) U.S. Cl.
CPC .......... *G02B 6/266* (2013.01); *G02B 6/2706* (2013.01); *G02B 6/2793* (2013.01); *G02B 6/29311* (2013.01); *G02B 6/29313* (2013.01); *G02B 6/29395* (2013.01); *G02B 6/32* (2013.01); *G02B 6/353* (2013.01); *G02B 6/3588* (2013.01); *G02B 6/4215* (2013.01)

(58) Field of Classification Search
CPC .... G02B 6/266; G02B 6/2706; G02B 6/2793; G02B 6/29311; G02B 6/29313; G02B 6/29395; G02B 6/32; G02B 6/353; G02B 6/3588; G02B 6/4215

USPC ......................................................... 385/140
See application file for complete search history.

(56) References Cited

U.S. PATENT DOCUMENTS

| 7,899,330 B2 | 3/2011 | Ye et al. |
| 2008/0253731 A1 | 10/2008 | Wang et al. |

FOREIGN PATENT DOCUMENTS

| JP | 2003-185945 A | 7/2003 | |
| JP | 2008-287052 A | 11/2008 | |
| JP | 2008287052 A | * 11/2008 | ............... G02B 6/08 |
| JP | 2008-292951 A | 12/2008 | |
| JP | 2008292951 A | * 12/2008 | ............... G02B 6/08 |
| JP | 2009-063964 A | 3/2009 | |

OTHER PUBLICATIONS

Decision to Grant a Patent issued in corresponding Japanese Application No. 2017-052869 dated Oct. 31, 2017 (6 pages).
Notification of Reasons for Refusal issued in corresponding Japanese Application No. 2017-052869 dated Jul. 4, 2017 (7 pages).

* cited by examiner

Primary Examiner — Jerry Blevins
(74) Attorney, Agent, or Firm — Osha Liang LLP

(57) ABSTRACT

An integrated optical device is mounted with two optical fibers that transmit a light and, as functional components in a space of a housing forming an optical path from one of the optical fibers to the other light, is provided with an optical power attenuator that attenuates, using vignetting, a light incident from the one optical fiber or a light emitted from the other optical fiber and a tunable filter that selects a light of a predetermined wavelength from among the light incident from the one optical fiber and emits this selected light from the other optical fiber.

6 Claims, 4 Drawing Sheets

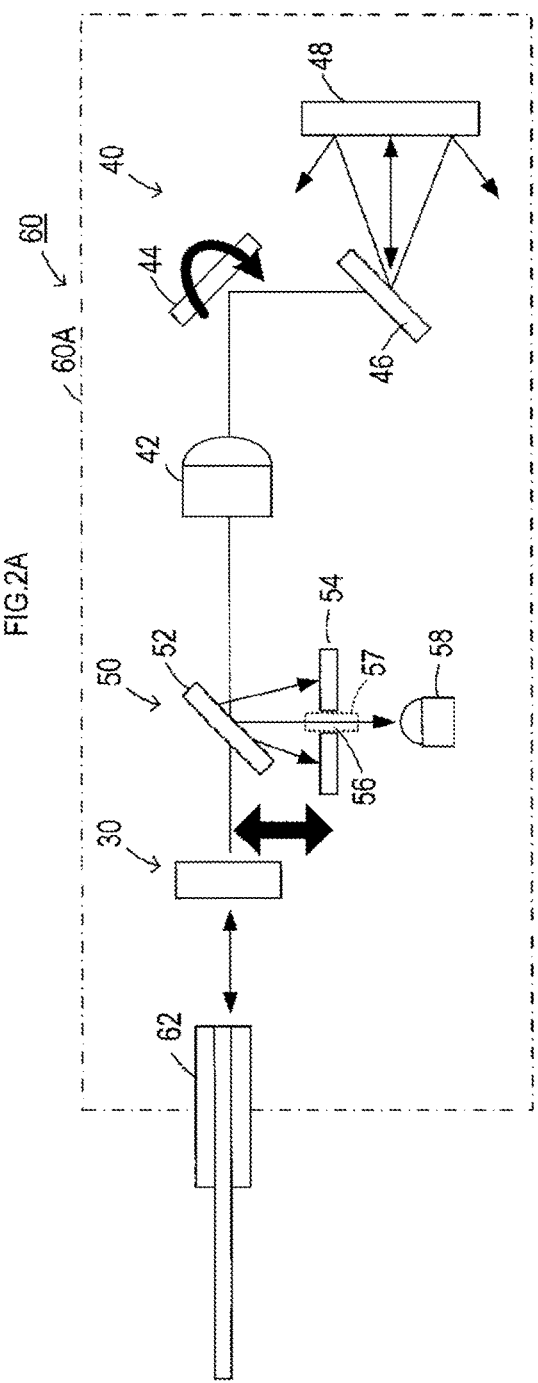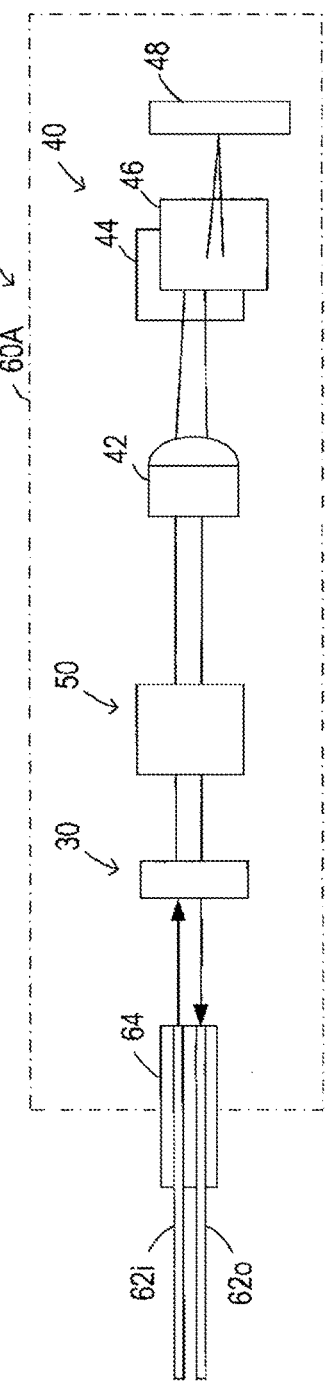

INTEGRATED OPTICAL DEVICE

FIELD

The present disclosure relates to an integrated optical device where a plurality of functions of an optical power attenuator, a tunable filter, and the like are integrated in one functional space.

BACKGROUND

Known conventionally as this type of integrated optical device are those described in patent literature 1 and patent literature 2.

The device described in patent literature 1 is provided with an optical power attenuator of a shutter type and an optical power monitor. Moreover, it is configured to attenuate at the optical power attenuator a light incident from an optical fiber on an input side, emit the attenuated light from an optical fiber on an output side, and detect at the optical power monitor a quantity of this light.

Furthermore, the device described in patent literature 2 is a tunable filter configured to diffract at a diffraction element a light incident from an optical fiber on an input side into a plurality of wavelength components and, by reflecting by a mirror a light of a desired wavelength component in an emission direction, emit this light from an optical fiber on an output side.

Furthermore, patent literature 2 describes not only how, by controlling a reflection angle of the mirror around two orthogonal axes, a wavelength of the light emitted from the optical fiber on the output side can be varied but also how the device can be made to function as an optical power attenuator by controlling a quantity of the light reflected at the mirror.

CITATION LIST

Patent Literature

[Patent Literature 1] US 2008/0253731 A1
[Patent Literature 2] U.S. Pat. No. 7,899,330 B2

Now, in an optical communication instrument such as an optical transceiver or an optical transponder that performs optical communication, various optical devices are built in such as the optical power attenuator, the optical power monitor, and the tunable filter above. Moreover, a size of the optical communication instrument is restricted by various standards such as CFP, CFP2, CFP4, etc., and a decrease in size is in demand.

Because of this, the optical devices built-in in the optical communication instrument also need to be decreased in size, and to do this, it is favorable to use an integrated optical device that integrates functions of the optical power attenuator, the optical power monitor, the tunable filter, and the like in one functional space.

However, the devices described in patent literatures 1, 2 merely have functions of an optical power attenuator and an optical power monitor or functions of a tunable filter and an optical power attenuator; at present, no device exists that has functions of an optical power attenuator, an optical power monitor, and a tunable filter.

Furthermore, in the integrated optical devices described in patent literatures 1, 2, configurations of the optical power attenuators differ and configurations and dispositions of other functional components provided in the space together with the optical power attenuator also differ. Because of this, merely combining the art described in patent literatures 1, 2 cannot realize an integrated optical device having functions of an optical power attenuator, an optical power monitor, and a tunable filter.

SUMMARY

In one aspect of the present disclosure, it is desirable to provide an integrated optical device where functions as an optical power attenuator, an optical power monitor, and a tunable filter can be realized only by functional components provided in a space of a housing.

An integrated optical device of one aspect of the present disclosure is mounted with two optical fibers that transmit a light and is provided with functional components that function as an optical power attenuator and a tunable filter in a space of a housing forming an optical path from one of the optical fibers to the other light.

The optical power attenuator attenuates, using vignetting, a light incident from the one optical fiber or a light emitted toward the other optical fiber, and the tunable filter selects a light of a predetermined wavelength from among the light incident from the one optical fiber and emits this selected light to the other optical fiber.

Because of this, according to one aspect of the integrated optical device of the present disclosure, the light of the predetermined wavelength that is incident from the one optical fiber and selected at the tunable filter can be adjusted at the optical power attenuator to a desired luminous intensity, made incident to the other optical fiber, and transmitted to an external device.

Furthermore, by providing an optical power monitor in the space of the housing, a signal level (that is, a quantity) of an optical signal transmitted to the external device via the other optical fiber can be detected.

Therefore, according to one aspect of the integrated optical device of the present disclosure, an integrated optical device can be realized where, in addition to the functions as the optical power attenuator and the tunable filter, a function as the optical power monitor can be readily added.

That is, while what is described in patent literature 2 has the functions as the optical power attenuator and the tunable filter, the function as the optical power attenuator is realized using the mirror for wavelength selection in the tunable filter.

Therefore, with what is described in patent literature 2, to detect a signal level of an optical signal transmitted to an external device via another optical fiber, an optical power monitor needs to be provided to the other optical fiber; the optical power monitor cannot be realized as a functional component provided in a space of a housing.

This is because an optical signal incident to the other optical fiber passes through only an optical path between the optical fiber and the mirror and does not diverge to a surrounding of this optical path; even if the optical power monitor is disposed in a space surrounding the optical path, the optical signal incident to the other optical fiber cannot be detected.

In contrast, with one aspect of the integrated optical device of the present disclosure, the optical power attenuator is configured as the functional component that attenuates the light using vignetting; therefore, a signal level of an optical signal incident to the other optical fiber is proportional to a luminous intensity of a light divergent in a space surrounding an optical path thereof.

Because of this, according to one aspect of the integrated optical device of the present disclosure, by disposing the functional component configuring the optical power monitor in the space of the housing, the signal level of the optical signal that is incident to the other optical fiber and transmitted to the external device can be detected.

Here, the optical power attenuator may be provided with a shutter blade disposed in the optical path of the integrated optical device and be configured as an attenuation control element that controls a blocking region by this shutter blade of the optical path.

Furthermore, the tunable filter may be provided with a lens that makes the light incident from the one optical fiber into a parallel light, a wavelength dispersion element that disperses the light that passes through this lens into different wavelengths, and a wavelength control element that controls an incidence angle to the wavelength dispersion element or an emission angle from the wavelength dispersion element and selects the light of the predetermined wavelength.

By configuring the integrated optical device in this manner, two types of control elements are disposed in the housing of the integrated optical device and, by individually driving these two types of control elements, an attenuating function by the optical power attenuator and a wavelength-selection function by the tunable filter can each be realized.

Note that the tunable filter may be provided with a diffraction grating of a transmissive type as the wavelength dispersion element. By doing so, unlike a configuration where a wavelength is dispersed by reflecting a light, there is no need to adjust a polarization angle arising due to reflection of the light; therefore, a configuration of the tunable filter can be simplified and the integrated optical device can be decreased in size.

Meanwhile, the optical power monitor can be provided to the integrated optical device according to one aspect of the present disclosure. In this situation, the optical power monitor is disposed in an optical path from the tunable filter to the other optical fiber and can be configured simply by a branching portion that branches a portion of the light of the predetermined wavelength and a light-receiving element that receives the light branched at the branching portion.

Furthermore, in this situation, the branching portion needs to cause the light of the predetermined wavelength emitted to the outside via the other optical fiber to become incident to the light-receiving element; to do this, a slit that selectively causes the light of the predetermined wavelength to pass therethrough may be provided in a transmission path of the light from the branching portion to the light-receiving element.

Furthermore, if an optical fiber is provided instead of the slit and the light of the predetermined wavelength is made incident to the light-receiving element via this optical fiber, a quantity of the light incident to the other optical fiber can be detected more accurately at the light-receiving element.

Furthermore, the integrated optical device of one aspect of the present disclosure may be provided with an optical isolator for inhibiting the light from regressing toward the one optical fiber, to which a light from the outside becomes incident.

By doing so, in a situation where an optical amplifier (EDFA: erbium-doped fiber amplifier) is provided in an optical communication instrument, a light output from the optical amplifier returning to the optical amplifier and the optical amplifier oscillating can be suppressed by the integrated optical device alone, which is built-in together with the optical amplifier.

BRIEF DESCRIPTION OF DRAWINGS

FIG. 2 An explanatory view representing an internal configuration of an integrated optical device provided in the optical transceiver: FIG. 2A is an explanatory view viewing a transmission path of an optical signal to each component from one direction, and FIG. 2B is an explanatory view viewing the transmission path of the optical signal from a direction orthogonal to that of FIG. 2A.

FIG. 4 An explanatory view representing a configuration of an optical isolator together with the transmission path of the optical signal.

DETAILED DESCRIPTION

Embodiments of the present invention are described below together with the drawings.

Figure 1:
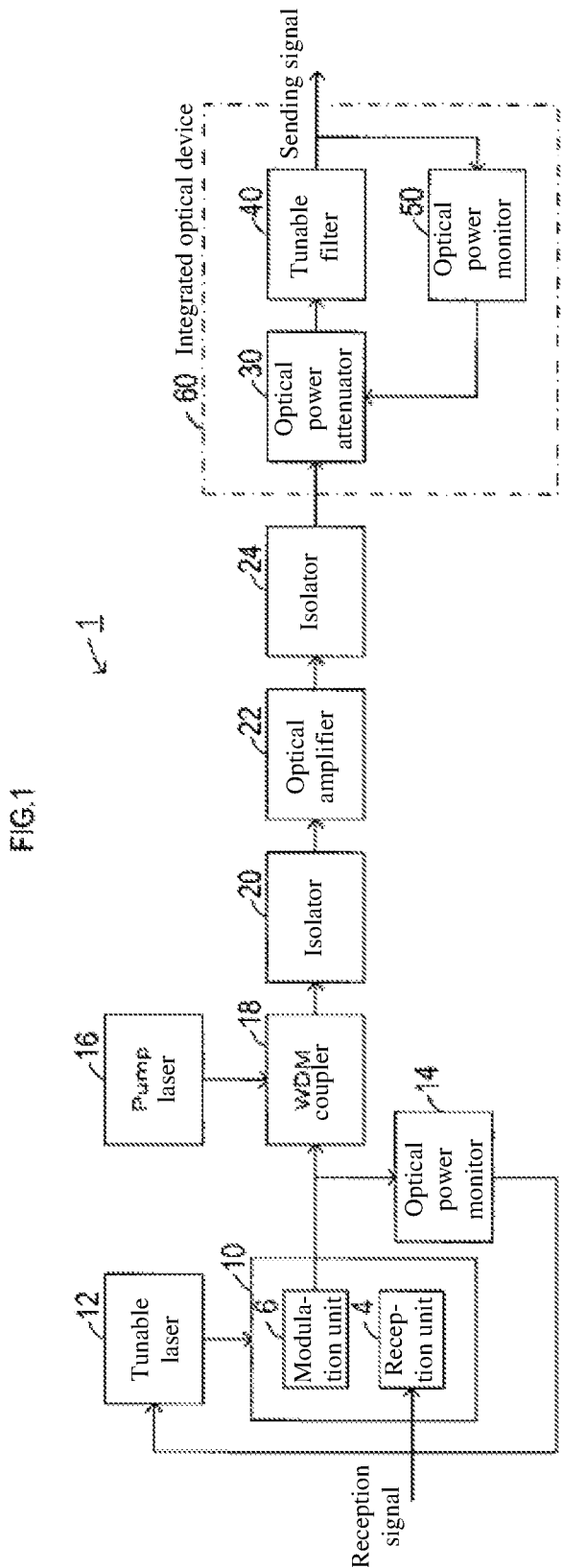
FIG. 1 A block diagram representing a configuration of an optical transceiver of one or more embodiments.

As illustrated in FIG. 1, an optical transceiver 1 of one or more embodiments of the present invention is provided with an integrated circuit 10 for optical communication. This integrated circuit 10 is provided with a reception unit 4, which receives an optical signal that is a reception signal and demodulates reception data, and a modulation unit 6 that, by modulating an optical signal of a predetermined wavelength into sending data, generates an optical signal for sending.

Furthermore, to this integrated circuit 10, an optical signal (laser light) of a predetermined wavelength is input from a tunable laser 12; the reception unit 4 and the modulation unit 6 operate by receiving this optical signal.

The optical signal for sending generated at the modulation unit 6 is input to a WDM coupler 18 functioning as a multiplexer, is multiplexed with a laser light from a pump laser 16 at the WDM coupler 18, and output to an optical amplifier 22.

Note that a quantity of the optical signal output from the modulation unit 6 is detected by an optical power monitor 14, and a detection result thereof is input to the tunable laser 12 and used to adjust a quantity (in other words, an intensity) of the laser light input to the integrated circuit 10.

The optical amplifier 22 is configured as an EDFA, which is mentioned above; on an input line and an output line of the optical signal to and from the optical amplifier 22, respectively provided are isolators 20, 24 that prevent the optical signal that is the sending signal from regressing to the WDM coupler 18 and the optical amplifier 22.

Furthermore, the optical signal output from the optical amplifier 22 via the isolator 24, after having the quantity adjusted at the optical power attenuator 30, is input to a tunable filter 40 and an optical signal of a predetermined wavelength is selectively output from the tunable filter 40.

Note that the tunable filter 40 is for removing an optical signal component unnecessary for communication (in other words, a noise component) from the optical signal input from the optical power attenuator 30; the optical signal output from the tunable filter 40 is output to the outside as the sending signal.

Furthermore, the quantity of the optical signal output from the tunable filter 40 is detected by an optical power monitor 50 and a detection result thereof is used to control an attenuation amount of the optical signal at the optical power attenuator 30 so the quantity of the optical signal output from the optical power attenuator 30 becomes a predetermined target quantity.

Here, the optical signal is transmitted via an optical fiber connecting each unit above; in one or more embodiments, the optical power attenuator 30, the tunable filter 40, and the optical power monitor 50 are stored in a housing configuring a transmission space of the optical signal as one integrated optical device 60.

Therefore, in the integrated optical device 60, the optical signal is transmitted using the space in the housing; by this configuration, a space required to dispose and connect the optical power attenuator 30, the tunable filter 40, and the optical power monitor 50 can be decreased.

As illustrated in FIG. 2, the integrated optical device 60 is provided with a housing 60A that stores each unit above and a capillary member 64 for fixing one end of an optical fiber 62 wired in the optical transceiver 1 to the housing 60A.

The capillary member 64 is for connecting to the integrated optical device 60 an input-side optical fiber 62i and an output-side optical fiber 62o for respectively inputting and outputting the optical signal. Moreover, in the housing 60A, disposed in an opposing position of the capillary member 64 is a shutter-type MEMS element as a functional component configuring the optical power attenuator 30.

Figure 3:
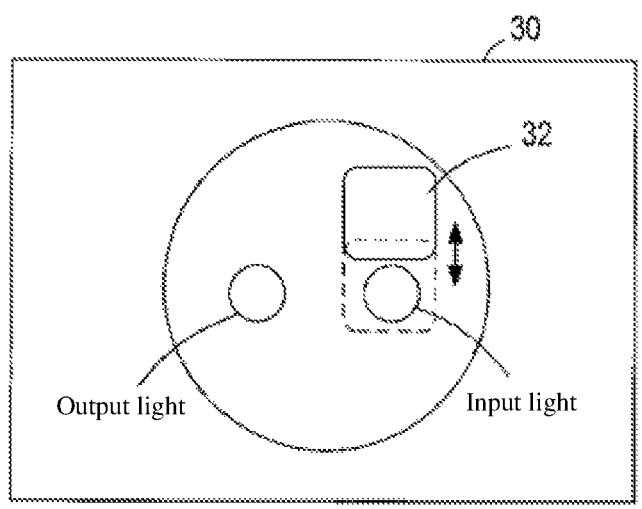
FIG. 3 An explanatory view representing a configuration of an optical power attenuator provided in the integrated optical device.

As illustrated in FIG. 3, this shutter-type MEMS element is provided in an optical aperture through which an optical beam passes, is provided with a shutter blade 32 that blocks an input light from the input-side optical fiber 62i, and is configured to control a position of the shutter blade 32 by a voltage.

That is, the optical power attenuator 30 is configured to control an attenuation amount of the input light in an analog manner by adjusting a quantity whereby the optical beam of the input light is vignetted by the shutter blade 32 by changing the position of the shutter blade 32 according to an input voltage.

Next, as functional components that realize a function thereof, the tunable filter 40 is provided with a lens (a so-called collimating lens) 42 that makes an optical signal that is incident from the input-side optical fiber 62i and attenuated at the optical power attenuator 30 into a parallel light and a diffraction grating 46 of a transmissive type that disperses the light that passes through the lens 42 into different wavelengths.

The diffraction grating 46 corresponds to the wavelength dispersion element above; in one or more embodiments, an incidence angle of the light to the diffraction grating 46 can be controlled by disposing a tilt-type MEMS element 44 on an optical path from the lens 42 to the diffraction grating 46.

That is, the tilt-type MEMS element 44 is provided with a mirror that can reflect the light and is configured to be able to adjust a reflection angle of the light by the mirror by a voltage. Because of this, by adjusting an input voltage to the tilt-type MEMS element 44, it is possible to control the incidence angle of the light to the diffraction grating 46 and control the light of the predetermined wavelength to be emitted in a certain direction from the diffraction grating 46.

Furthermore, a reflection mirror 48 is provided in an emission direction of the light transmitted through the diffraction grating 46. This reflection mirror 48 makes the light of the predetermined wavelength incident to the output-side optical fiber 62o via the diffraction grating 46, the tilt-type MEMS element 44, and the lens 42 by reflecting the light emitted in the certain direction from the diffraction grating 46 toward the diffraction grating 46.

Therefore, the optical signal of the predetermined wavelength selected at the tunable filter 40 becomes incident to the output-side optical fiber 62o through the optical aperture of the optical power attenuator 30 and is output to the outside as the sending signal from the output-side optical fiber 62o.

Note that dispositions of the tilt-type MEMS element 44 and the diffraction grating 46 may be reversed in the optical path of the optical signal. In this situation, the tilt-type MEMS element 44 reflects the light of the predetermined wavelength in a certain direction to the reflection mirror 48 by adjusting an emission angle of the optical signal from the diffraction grating 46 to the reflection mirror 48.

Furthermore, in this situation, if the reflection mirror 48 per se is configured in the tilt-type MEMS element 44, there is no need to separately provide the reflection mirror 48 and a configuration of the integrated optical device 60 can be further simplified.

Next, the optical power monitor 50 is disposed in a passage path (optical path) of the optical signal of the predetermined wavelength from the tunable filter 40 to the output-side optical fiber 62o.

As functional components realizing a function thereof, the optical power monitor 50 is provided with a branching portion 52 that branches a portion of the optical signal emitted from the tunable filter 40 via the lens 42 and a light-receiving element 58 that receives the optical signal branched at the branching portion 52 and detects a quantity thereof. Note that the light-receiving element 58 is configured as a photodiode, a phototransistor, or the like.

Furthermore, in an incidence path of the optical signal from the branching portion 52 to the light-receiving element 58, provided is a shielding portion 54 having a slit 56 for selectively causing the optical signal tuned at the tunable filter 40 and incident to the output-side optical fiber 62o to pass through.

Because of this, a detection signal obtained via the light-receiving element 58 of the optical power monitor 50 is proportional to the quantity of the optical signal emitted from the output-side optical fiber 62o.

Therefore, by adjusting the attenuation amount of the optical signal by the optical attenuator 30 according to this detection signal (voltage), a signal level (quantity) of the optical signal emitted to the outside from the output-side optical fiber 62o can be controlled to an appropriate level.

Note that the optical power monitor 50 may be provided in the tunable filter 40; however, because doing so causes a quantity of the collimated light to be detected, while the quantity of the optical signal incident to the output-side optical fiber 62o can be detected (estimated), a detection precision thereof is low.

In contrast, in one or more embodiments, because the optical power monitor 50 is disposed in an optical path of a divergent light between the lens 42 and the output-side optical fiber 62o and configured as above, the quantity of the optical signal incident to the output-side optical fiber 62o can be detected precisely.

As described above, in one or more embodiments, the optical power attenuator 30, the tunable filter 40, and the optical power monitor 50 configuring the optical transceiver 1 are stored in one housing 60A as the integrated optical device 60 and each of these units is connected via the space in the housing 60A.

Therefore, functions of the optical power attenuator 30, the tunable filter 40, and the optical power monitor 50 can be realized in one integrated optical device 60, enabling each of these units to be decreased in size and the optical transceiver 1 to be decreased in size.

Furthermore, the attenuation amount of the optical power attenuator 30 and the wavelength of the optical signal selected at the tunable filter 40 can be controlled individually by the input voltages to the shutter-type MEMS element and the tilt-type MEMS element provided respectively in these units. Because of this, the optical power attenuator 30 and the tunable filter 40 can each be operated appropriately.

Furthermore, because the optical power monitor 50 can precisely detect the quantity of the optical signal output from the output-side optical fiber 62*o*, the signal level of the optical signal output from the output-side optical fiber 62*o* can be controlled to an appropriate level via the optical power attenuator 30.

Various embodiments of the present invention are described above, but the integrated optical device of the present invention is not limited to the above embodiments and can be implemented with various modifications.

For example, in one or more of the above embodiments, the optical power attenuator 30 is described as attenuating the light incident from the input-side optical fiber 62*i*. However, because it is sufficient for the optical power attenuator 30 to be able to control the optical signal incident to the output-side optical fiber 62*o* to the target quantity based on the detection result by the optical power monitor 50, the shutter blade 32 may be disposed in the optical path of the output light and configured to control an attenuation amount of the output light.

Furthermore, while one or more of the above embodiments are described as providing the diffraction grating 46 of the transmissive type as the wavelength dispersion element in the tunable filter 40, a diffraction grating of a reflective type may be provided. Moreover, in one or more of the above embodiments, the optical power monitor 50 is described as being provided with the shielding portion 54 having the slit 56 in the optical path of the optical signal from the branching portion 52 to the light-receiving element 58 so the optical signal incident to the output-side optical fiber 62*o* can be detected.

In contrast, to further increase a linearity between the optical signal incident to the light-receiving element 58 of the optical power monitor 50 and the optical signal incident to the output-side optical fiber 62*o*, instead of the slit 56, an optical fiber 57 or an optical-fiber stub illustrated by the dotted line in FIG. 2 may be provided.

By doing so, a portion of the optical signal incident to the output-side optical fiber 62*o* can become incident to the light-receiving element 58 via the optical fiber or the optical-fiber stub and the linearity between the detection signal (voltage) obtained via the light-receiving element 58 and the optical signal incident to the output-side optical fiber 62*o* can be further increased.

Furthermore, the branching portion 52 configuring the optical power monitor 50 may be configured using a spatial filter plate whose transmittance is spatially designed so an intensity of the optical signal emitted from the output-side optical fiber 62*o* and a reception intensity of the optical signal at the light-receiving element 58 become linear.

Meanwhile, while the integrated optical device 60 of one or more of the above embodiments are described as having the functions of the optical power attenuator 30, the tunable filter 40, and the optical power monitor 50, the integrated optical device 60 may be further provided with a functional component as an isolator 24.

In this situation, as illustrated in FIG. 4, the isolator 24 is provided with a birefringent crystal 24A, a half-wave plate 24B, and a Faraday rotator 24C and can be realized as a spatial component configuring a reflective isolator.

Figure 4A:
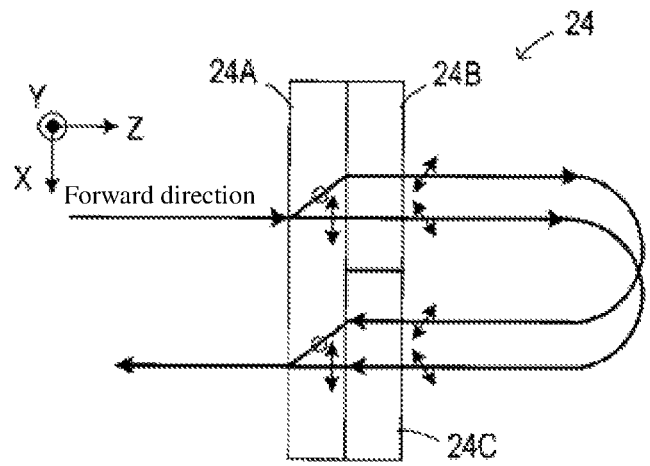
FIG. 4A is an explanatory view representing a transmission path in a forward direction of the optical signal.
Figure 4B:
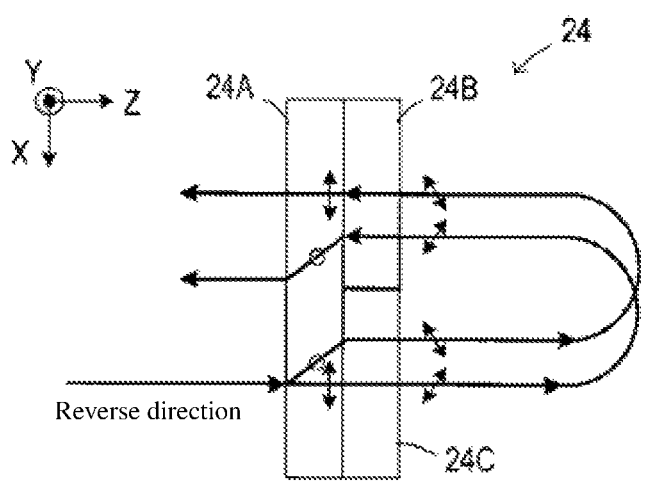
FIG. 4B is an explanatory view representing a transmission path in a reverse direction of the optical signal.

Furthermore, by configuring the isolator 24 in this manner, as illustrated in FIG. 4A, an optical signal incident in a forward direction can be emitted in an output direction and, as illustrated in FIG. 4B, an optical signal incident in a reverse direction from the output direction can be emitted in a direction different from that of the optical signal in the forward direction.

However, in a situation of providing the function as the isolator 24 in the integrated optical device 60, the isolator 24 does not necessarily need to be configured as illustrated in FIG. 4 and is sufficient as long as it is a spatial component that can realize the function as the isolator 24.

Furthermore, in one or more of the above embodiments, the integrated optical device 60 is described as being provided with the functional components as the optical power monitor 50, but with one or more embodiment where the function as the optical power monitor 50 is unnecessary, these functional components may be removed such that these functional components are provided only to one or more embodiment where these are necessary.

Furthermore, while in one or more of the above embodiments the integrated optical device 60 is described as being provided in the optical transceiver 1, the integrated optical device of the present disclosure is not limited to an optical transceiver and may be provided in another optical communication instrument such as an optical transponder.

Furthermore, a plurality of functions had by one component in one or more of the above embodiments may be realized by a plurality of components and one function had by one component may be realized by a plurality of components. Moreover, a plurality of functions had by a plurality of components may be realized by one component and one function realized by a plurality of components may be realized by one configuration. Moreover, a portion of the configuration of one or more of the above embodiments may be omitted. Moreover, at least a portion of the configuration of one or more of the above embodiments may be added to or substituted in another configuration of the above embodiment. Note that all aspects included in the technical idea specified only by the text given in the scope of patent claims are the one or more embodiments of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST

1 . . . optical transceiver, 4 . . . reception unit, 6 . . . modulation unit, 10 . . . integrated circuit, 12 . . . tunable laser, 14 . . . optical power monitor, 16 . . . pump laser, 18 . . . WDM coupler, 20 . . . isolator, 22 . . . optical amplifier, 24 . . . isolator, 24A . . . birefringent crystal, 24B . . . half-wave plate, 24C . . . Faraday rotator, 30 . . . optical power attenuator (shutter-type MEMS element), 32 . . . shutter blade, 40 . . . tunable filter, 42 . . . lens, 44 . . . tilt-type MEMS element, 46 . . . diffraction grating, 48 . . . reflection mirror, 50 . . . optical power monitor, 52 . . . branching portion, 54 . . . shielding portion, 56 . . . slit, 58 . . . light-receiving element, 60 . . . integrated optical device, 60A . . . housing, 62*i* . . . input-side optical fiber, 62*o* . . . output side optical fiber, 64 . . . capillary member.

What is claimed is:

1. An integrated optical device mounted with two optical fibers that transmit light and comprises, in a space of a housing that forms an optical path from one of the optical fibers to the other optical fiber:
   an optical power attenuator that attenuates, using vignetting, light incident from the one optical fiber or light emitted to the other optical fiber;
   a tunable filter that selects light of a predetermined wavelength from among the light incident from the one optical fiber and emits the selected light toward the other optical fiber, and
   an optical power monitor that detects intensity of light incident to the other optical fiber, wherein
   the optical power attenuator comprises a shutter blade disposed in the optical path and is an attenuation control element that controls a blocking region by the shutter blade of the optical path,
   the tunable filter comprises:
      a collimating lens that receives the light incident from the one optical fiber;
      a wavelength dispersion element that disperses the light that passes through the collimating lens into different wavelengths; and
      a wavelength control element that controls an incidence angle to the wavelength dispersion element or an emission angle from the wavelength dispersion element to select the light of the predetermined wavelength,
   the tunable filter emits the light of the predetermined wavelength selected by the wavelength control element from the collimating lens towards the other optical fiber, and
   the optical power monitor comprises:
      a branching portion that is disposed in an optical path from the tunable filter to the other optical fiber and branches a portion of the light of the predetermined wavelength;
      a light-receiving element that receives the light branched at the branching portion; and
      a shielding portion that is disposed in an incidence path of the light from the branching portion to the light-receiving element, and comprises a slit causing light corresponding to the light incident to the other optical fiber, among the light from the branching portion, to pass through.

2. The integrated optical device according to claim 1, wherein the wavelength dispersion element is a diffraction grating of a transmissive type.

3. The integrated optical device according to claim 1, further comprising an optical isolator that is disposed in the space and inhibits the light from regressing toward the one optical fiber.

4. An integrated optical device mounted with two optical fibers that transmit light and comprises, in a space of a housing that forms an optical path from one of the optical fibers to the other optical fiber:
   an optical power attenuator that attenuates, using vignetting, light incident from the one optical fiber or light emitted to the other optical fiber;
   a tunable filter that selects light of a predetermined wavelength from among the light incident from the one optical fiber and emits the selected light toward the other optical fiber, and
   an optical power monitor that detects intensity of light incident to the other optical fiber, wherein
   the optical power attenuator comprises a shutter blade disposed in the optical path and is an attenuation control element that controls a blocking region by the shutter blade of the optical path,
   the tunable filter comprises:
      a collimating lens that receives the light incident from the one optical fiber;
      a wavelength dispersion element that disperses the light that passes through the collimating lens into different wavelengths; and
      a wavelength control element that controls an incidence angle to the wavelength dispersion element or an emission angle from the wavelength dispersion element to select the light of the predetermined wavelength,
   the tunable filter emits the light of the predetermined wavelength selected by the wavelength control element from the collimating lens towards the other optical fiber, and
   the optical power monitor comprises:
      a branching portion that is disposed in an optical path from the tunable filter to the other optical fiber and branches a portion of the light of the predetermined wavelength;
      a light-receiving element that receives the light branched at the branching portion; and
      a shielding portion that is disposed in an incidence path of the light from the branching portion to the light-receiving element, and comprises another optical fiber that causes the light corresponding to the light incident to the other optical fiber become incident to the light-receiving element.

5. The integrated optical device according to claim 4, wherein the wavelength dispersion element is a diffraction grating of a transmissive type.

6. The integrated optical device according to claim 4, further comprising an optical isolator that is disposed in the space and inhibits the light from regressing toward the one optical fiber.

* * * * *